United States Patent
Yoshida (10) Patent No.: US 10,211,945 B2
(45) Date of Patent: Feb. 19, 2019

(54) STATION-SIDE DEVICE AND WAVELENGTH CHANGEOVER MONITORING METHOD

(71) Applicant: NIPPON TELEGRAPH AND TELEPHONE CORPORATION, Tokyo (JP)

(72) Inventor: Tomoaki Yoshida, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/564,236

(22) PCT Filed: Apr. 20, 2016

(86) PCT No.: PCT/JP2016/062481
§ 371 (c)(1),
(2) Date: Oct. 4, 2017

(87) PCT Pub. No.: WO2016/171159
PCT Pub. Date: Oct. 27, 2016

(65) Prior Publication Data
US 2018/0131462 A1    May 10, 2018

(30) Foreign Application Priority Data
Apr. 22, 2015   (JP) ................. 2015-087853

(51) Int. Cl.
*H04J 14/00*   (2006.01)
*H04J 14/02*   (2006.01)
(Continued)

(52) U.S. Cl.
CPC ...... *H04J 14/0247* (2013.01); *H04J 14/0223* (2013.01); *H04L 12/44* (2013.01);
(Continued)

(58) Field of Classification Search
CPC .... H04B 10/27; H04B 10/032; H04B 10/035; H04J 14/02; H04J 14/0246; H04J 14/0247;
(Continued)

(56) References Cited

U.S. PATENT DOCUMENTS

2007/0092256 A1* 4/2007 Nozue ................. H04J 14/0282
                                                                                                398/72
2014/0161461 A1   6/2014 Lee et al.
2015/0023664 A1* 1/2015 Mukai ................. H04J 14/0242
                                                                                                398/58

FOREIGN PATENT DOCUMENTS

| EP | 2840742 A1 | 2/2015 |
| JP | 2011-139320 A | 7/2011 |
| JP | 2014-143502 A | 8/2014 |

OTHER PUBLICATIONS

S. Kimura, WDM/TDM-PON technologies for future flexible optical access networks, OECC2010, 6A1-1, 2010.
(Continued)

*Primary Examiner* — Hanh Phan
(74) *Attorney, Agent, or Firm* — Harness, Dickey & Pierce, P.L.C.

(57) ABSTRACT

A station-side device of the present invention includes: a wavelength change instruction unit that issues, to a subscriber-side device, a wavelength change instruction to change a transfer-source wavelength assigned to the subscriber-side device to a transfer-target wavelength different from the transfer-source wavelength; a transfer-source port that transmits and receives an optical signal of the transfer-source wavelength; a transfer-target port that transmits and receives an optical signal of the transfer-target wavelength; a transfer-source port monitoring unit that detects a connection between the transfer-source port and the subscriber-side device; a transfer-target port monitoring unit that detects a
(Continued)

connection between the transfer-target port and the subscriber-side device; a transfer-source timer that counts, at the transfer-source port, an elapsed time from a predetermined starting time in response to the wavelength change instruction, and ends the counting of the elapsed time in a case where change to the transfer-target wavelength is complete; and a transfer-target timer that counts, at the transfer-target port, an elapsed time from a predetermined time in response to the wavelength change instruction, and ends the counting of the elapsed time in a case where the change to the transfer-target wavelength is complete.

4 Claims, 8 Drawing Sheets (51) Int. Cl.
| | | |
|---|---|---|
| H04L 12/44 | (2006.01) | |
| H04L 12/803 | (2013.01) | |
| H04Q 11/00 | (2006.01) | |
| H04L 12/24 | (2006.01) | |
| H04L 12/26 | (2006.01) | |
| H04L 12/923 | (2013.01) | |

(52) U.S. Cl.
CPC ...... *H04L 41/0677* (2013.01); *H04L 41/0681* (2013.01); *H04L 41/0816* (2013.01); *H04L 41/0863* (2013.01); *H04L 43/0811* (2013.01); *H04L 47/125* (2013.01); *H04Q 11/0067* (2013.01); *H04L 47/762* (2013.01); *H04Q 2011/0083* (2013.01); *H04Q 2011/0086* (2013.01)

(58) Field of Classification Search
CPC ............... H04J 14/0223; H04J 14/0282; H04J 14/0228; H04J 14/0238; H04J 14/0239; H04J 14/0252; H04Q 11/0067; H04Q 11/0066
USPC ........ 398/66, 67, 68, 69, 70, 71, 72, 79, 98, 398/99, 100, 33, 38, 58, 45, 48, 46, 49, 2, 398/3, 4, 5, 10, 13, 17, 135, 136; 370/352, 392, 389, 468, 465
See application file for complete search history.

(56) References Cited

OTHER PUBLICATIONS

International Search Report for PCT/JP2016/062481, ISA/JP, dated Jul. 19, 2016, with attached translation.
Tomoaki Yoshida NTT Japan: "Re-modified proposal for a wavelength tuning sequence in G.989.3 using PLOAM messages; C", ITUT Draft; Study Period 2013-2016, International Telecommunication Union, Geneva; CH, vol. 2/15, Dec. 2, 2013 (Dec. 2, 2013), pp. 1-17 (in English).
Extended European Search Report for parallel application EP 16783180.9, EPO, Munich, dated Aug. 22, 2018. (in English).

* cited by examiner

STATION-SIDE DEVICE AND WAVELENGTH CHANGEOVER MONITORING METHOD

TECHNICAL FIELD

The present invention relates to a technique relating to a dynamic change method of an upstream wavelength and a downstream wavelength in a PON (Passive Optical Network) in which wavelength multiplexing and time division multiplexing are combined.

This application is a 371 National Phase of PCT/JP2016/062481, filed Apr. 20, 2016. Priority is claimed on Japanese Patent Application No. 2015-087853, filed on Apr. 22, 2015, the content of which is incorporated herein by reference.a1

BACKGROUND ART

The spread of FTTH (Fiber To The Home) is progressing globally due to an increasing need for high-speed access services. Most FTTH services are provided by an economically excellent PON (Passive Optical Network) system, in which a single storage station-side device (OSU: Optical Subscriber Unit) stores a plurality of subscriber-side devices (ONU: Optical Network Unit) by time division multiplexing (TDM).

In an upstream communication by a TDM-PON system, the system bandwidth is shared between the ONUs based on a dynamic bandwidth allocation calculation in the OSU, and each ONU intermittently transmits an optical signal only within a transmission permission time period notified by the OSU, thereby preventing collision between optical signals.

The current main systems are GE-PON (Gigabit Ethernet (registered trademark) PON) and G-PON (Gigabit-capable PON), which have gigabit-level transmission speeds. In addition to the progress of video distribution services, the emergence of applications that upload/download large-capacity files requires further increases in the capacity of PON systems.

However, in the TDM-PON system described above, since the system bandwidth is expanded by increasing the line rate, the reception characteristics are greatly deteriorated due to the effects of higher speed and wavelength dispersion, and further, the economy of the burst transceiver becomes a problem, thereby making it difficult to increase the capacity to more than 10 gigabytes.

Figure 1:
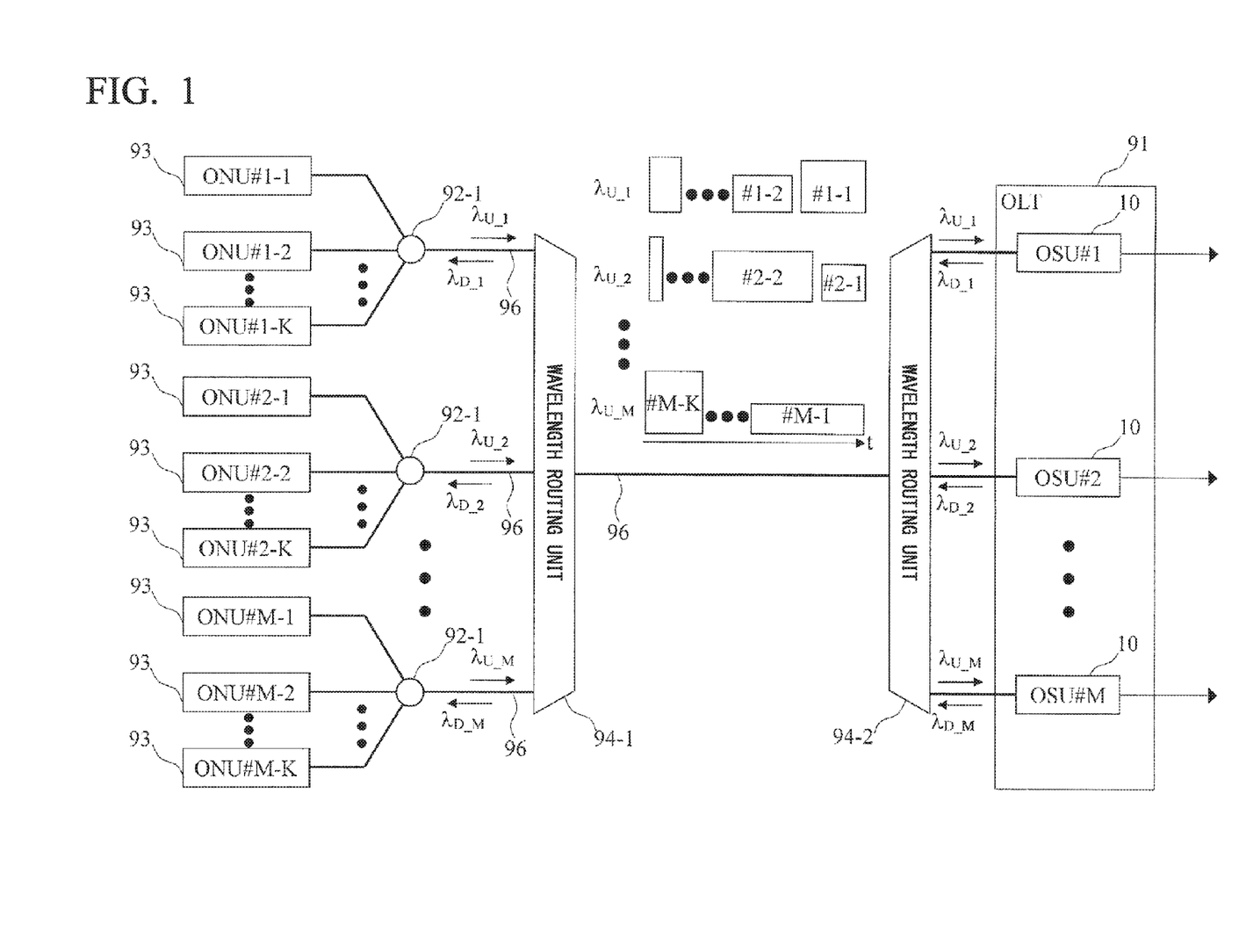
FIG. 1 shows an example of a configuration of a WDM/TDM-PON system related to the present invention.

Application of a wavelength division multiplexing (WDM) technique is being investigated for increasing the capacity to more than 10 gigabytes. FIG. 1 is an example of a WDM/TDM-PON system in which a WDM technique is combined with a TDM-PON system related to the present invention.

The WDM/TDM-PON described in the present specification is synonymous with a basic system TWDM (Time and Wavelength Division Multiplexing)-PON of the Recommendation G.989 series internationally standardized in the ITU-T (International Telecommunication Union—Telecommunication Standardization Sector). Furthermore, the technique described in the present specification can also be applied to a WDM-PON.

The WDM/TDM-PON system shown in FIG. 1 includes OSUs 10 #1 to #M and a plurality of ONUs 93. The OSUs 10 #1 to #M respectively communicate with the plurality of ONUs 93 using a wavelength set of $\lambda_{U\_1,D\_1}$ to $\lambda_{U\_M,D\_M}$. Here, $\lambda_{U\_1,D\_1}$ indicates a combination of an upstream wavelength $\lambda_{U\_1}$ of an upstream signal and a downstream wavelength $\lambda_{D\_1}$ of a downstream signal.

Each ONU 93 is fixedly assigned a downstream wavelength and an upstream wavelength according to the terminal of a wavelength routing unit 94-1 to which it is connected. Temporal signal overlap among all ONUs 93 is permitted for #1 to #M, that is to say, up to the number of OSUs 10. Consequently, by adding an OSU 10, the system bandwidth can be expanded without increasing the line rate per wavelength.

Among the terminals of the wavelength routing unit 94-1, each ONU 93 connected to the same terminal on the ONU 93 side and connected to an optical fiber transmission line 96 is logically connected to the same OSU 10, and share an upstream bandwidth and a downstream bandwidth.

For example, the ONUs 93 #2-1 to #2-K are logically connected to the OSU 10 #2. Here, the logical connection between each ONU 93 and the OSU 10 is constant, and it is not possible to distribute traffic load among different OSUs 10 #1 to #M according to the state of traffic load of each OSU 10.

Figure 2:
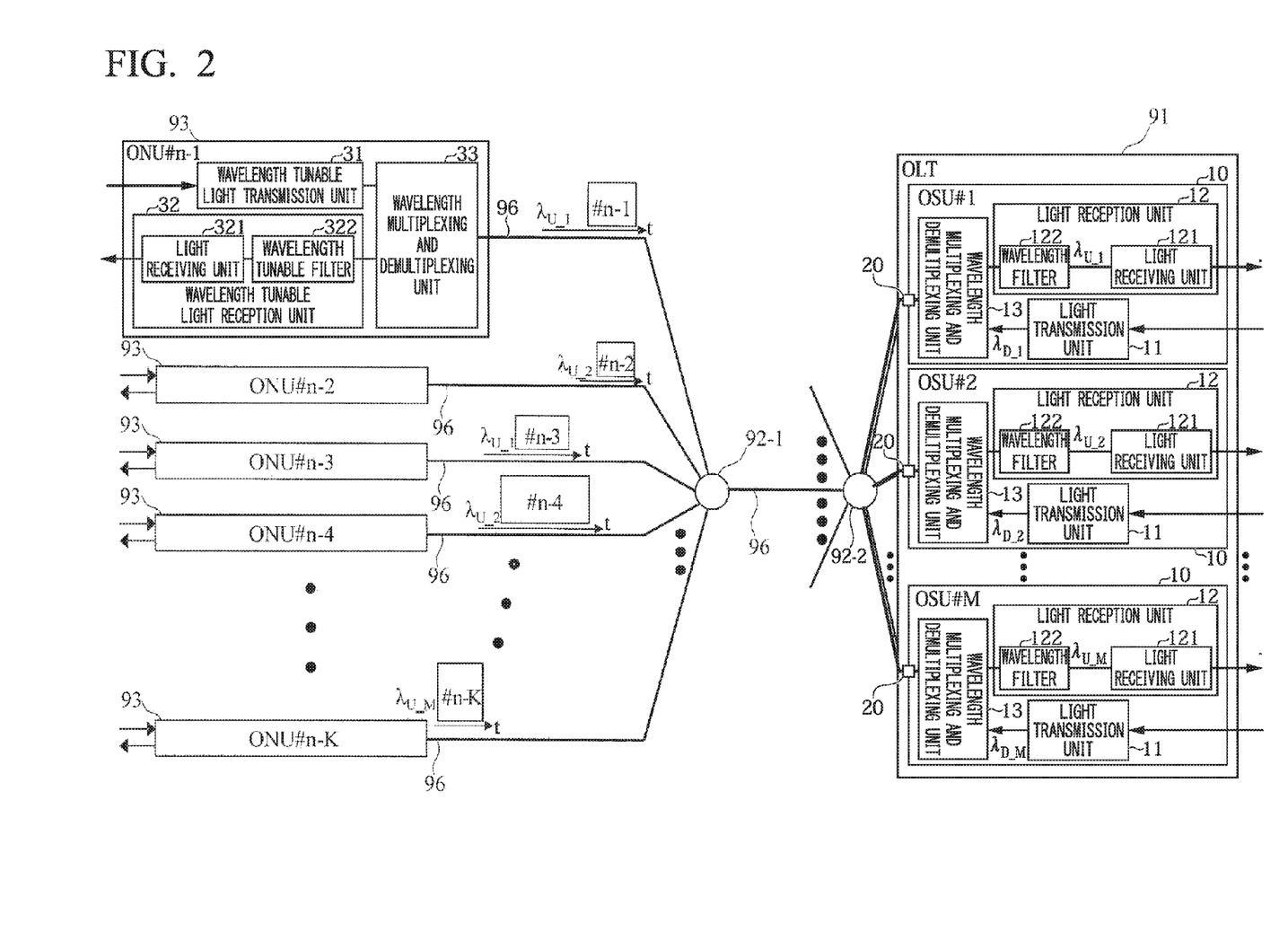
FIG. 2 shows an example of a configuration of a wavelength tunable WDM/TDM-PON system related to the present invention.

On the other hand, as shown in FIG. 2, proposed is a wavelength tunable WDM/TDM-PON system whose optical transmitter and optical receiver mounted on the ONU 93 are equipped with a wavelength tuning function (for example, refer to Non-Patent Document 1).

The ONU 93 includes a wavelength tunable light transmission unit 31, a wavelength tunable light reception unit 32 having a light receiving unit 321 and a wavelength tunable filter 322, and a wavelength multiplexing and demultiplexing unit 33.

In the configuration of Non-Patent Document 1, it is possible to individually change the logical connection destination OSU 10 of each ONU 93 by switching the transmission/reception wavelength in the ONU 93. As a result of using this function, when there is an OSU 10 in a high-load state, the logical connection between the ONU 93 and the OSU 10 is changed so that the traffic load is dispersed to an OSU 10 in a low-load state, and it is possible to prevent a deterioration in the communication quality of the OSU 10 in the high-load state.

Furthermore, when a high-load state of an OSU 10 regularly occurs, in the WDM/TDM-PON system of FIG. 1, it is necessary to add system bandwidth in order to ensure a fixed communication quality. In the wavelength tunable WDM/TDM-PON system of FIG. 2, it is possible to ensure a fixed communication quality by effectively utilizing the bandwidth of the entire system by distributing the traffic load among the OSUs 10, and capital investments for expanding the system bandwidth can be minimized.

PRIOR ART DOCUMENTS

Non-Patent Document

[Non-Patent Document 1] S. Kimura, "WDM/TDM-PON technologies for future flexible optical access networks," OECC2010, 6A1-1, 2010

SUMMARY OF INVENTION

Problem to be Solved by the Invention

In the wavelength tunable WDM/TDM-PON system shown in FIG. 2, a wavelength changeover is performed that changes the association of the ONU 93 from a transfer-source OSU 10 to a transfer-target OSU 10. If it cannot be changed to the transfer-target OSU 10 for some reason, a switch-back that autonomously restores the ONU 93 to the transfer-source OSU 10 is necessary. Here, a switch-back refers to returning to an upstream wavelength and a downstream wavelength of a state in which the transfer-source OSU 10 and the ONU are logically connected (state before wavelength changeover).

When monitoring of the timer of the transfer-target OSU 10 is started in response to a wavelength changeover instruction, timer monitoring is executed until timer expiry occurs after an arbitrary time set beforehand. In the timer monitoring, if the wavelength changeover is completed normally in the ONU 93 instructed to perform the wavelength changeover, the normal completion of the wavelength changeover is reported to the transfer-target OSU 10 as a wavelength changeover completion signal from the ONU 93 within the timer monitoring period. At this time, the transfer-target OSU 10 recognizes that the wavelength changeover was completed normally, and ends the timer monitoring even if it is within the set timer monitoring period. On the other hand, if the normal completion of the wavelength changeover with respect to the transfer-target OSU 10 is not reported as a wavelength changeover completion signal from the ONU 93 within the timer monitoring period (for example, because the ONU 93 could not execute the wavelength changeover for some reason), then timer expiry occurs in the transfer-target OSU 10, and it is possible to recognize that the wavelength changeover was not executed in the ONU 93.

In a case where a wavelength changeover to the transfer-target OSU 10 fails due to timer expiry of the timer that manages the transfer-target OSU 10 when a switch-back to the transfer-source OSU 10 is performed, the situation that the OLT 91 has failed to perform the wavelength changeover can be understood. However, by the timer monitoring of the transfer-target OSU 10 alone, it is unknown if a switch-back to the changeover-source (transfer-source) OSU 10 has occurred, and it is necessary to understand the cause from the state of the device and the communications, and the like. Therefore, it becomes difficult to quickly analyze and resolve the abnormal state.

Consequently, the OLT 91 cannot determine if the ONU 93 has performed a switch-back that returns it to the transfer-source wavelength. Further, it is necessary to understand the cause from the state of the device and the communications, and the like. Therefore, it was difficult to quickly analyze and resolve the abnormal state.

Means for Solving the Problem

The present invention performs timer monitoring at both an OSU 10 serving as a reception unit of transfer-target wavelength signals in an OLT 91, and an OSU 10 serving as a reception unit of transfer-source wavelength signals, and normal completion processing is performed between the OSUs 10 at the time of a switch-back, and thus, an alarm is issued only when there is truly an abnormality in the wavelength changeover operation in a PON.

Specifically, a station-side device according to the present invention includes:

a wavelength change instruction unit that issues, to a subscriber-side device, a wavelength change instruction to change a transfer-source wavelength assigned to the subscriber-side device to a transfer-target wavelength different from the transfer-source wavelength;

a transfer-source port that transmits and receives a signal light of the transfer-source wavelength;

a transfer-target port that transmits and receives a signal light of the transfer-target wavelength;

a transfer-source port monitoring unit that detects a connection between the transfer-source port and the subscriber-side device;

a transfer-target port monitoring unit that detects a connection between the transfer-target port and the subscriber-side device;

a transfer-source timer that starts the counting of an elapsed time in response to the wavelength change instruction, and ends the counting of the elapsed time in a case where the transfer-source port monitoring unit detects a connection within a previously determined predetermined time from starting the counting; and a transfer-target timer that starts the counting of an elapsed time in response to the wavelength change instruction, and ends the counting of the elapsed time in a case where the transfer-target port monitoring unit detects a connection within a previously determined predetermined time from starting the counting.

In a station-side device according to the present invention, in a case where the transfer-source port monitoring unit detects a connection with the subscriber-side device within the predetermined time from the transfer-source timer and the transfer-target timer starting the counting of the elapsed time, the transfer-target timer may end the counting of the elapsed time, and the station-side device may end the counting of the elapsed time at the transfer-source timer and the transfer-target timer, and in a case where the transfer-target port monitoring unit detects a connection with the subscriber-side device within the predetermined time from the transfer-source timer and the transfer-target timer starting the counting of the elapsed time, the transfer-source timer may end the counting of the elapsed time, and the station-side device may end the counting of the elapsed time at the transfer-source timer and the transfer-target timer.

In a station-side device according to the present invention, the station-side device may issue a notification that an abnormality has occurred at the transfer-source port in a case of an expired state in which the counting of the elapsed time at the transfer-source timer has not ended when the predetermined time has elapsed from the transfer-source timer and the transfer-target timer starting the counting of the elapsed time, and the station-side device may issue a notification that an abnormality has occurred to the transfer-target port in a case of an expired state in which the counting of the elapsed time at the transfer-target timer has not ended when the predetermined time has elapsed from the transfer-source timer and the transfer-target timer starting the counting of the elapsed time.

Specifically, in a wavelength changeover monitoring method according to the present invention a station-side device performs in a sequence:

a wavelength change instruction step of issuing, to a subscriber-side device, a wavelength change instruction to change a transfer-source wavelength assigned to the subscriber-side device to a transfer-target wavelength different from the transfer-source wavelength;

a port monitoring step of detecting a connection between a transfer-source port, which transmits and receives a signal light of the transfer-source wavelength, and the subscriber-side device, and detecting a connection between a transfer-target port, which transmits and receives an signal light of the transfer-target wavelength, and the subscriber-side device; and a timer ending step of starting counting of an elapsed time in response to the wavelength change instruction, ending the counting of the elapsed time at a transfer-source timer in a case where a connection between the transfer-source port and the subscriber-side device is detected within a previously determined predetermined time from starting the counting, and ending the counting of the elapsed time at a transfer-target timer in a case where a connection between the transfer-target port and the subscriber-side device is detected within a previously determined predetermined time from starting the counting.

The respective inventions described above may be combined to the greatest extent possible.

Effect of the Invention

The OLT 91 cannot determine, at the point it issues a wavelength change instruction, whether the ONU 93 will perform a normal wavelength changeover or will perform a switch-back. However, according to the present invention, the OLT 91 includes timers for monitoring the transfer-target port and the transfer-source port, and the respective timers end the counting in response to the ONU 93 connecting any one port. Consequently, since the OLT 91 monitors the completion of a normal wavelength changeover or a switch-back changeover at both ports, it is able to correctly complete both wavelength changeover sequences and identify them even if it cannot determine which wavelength changeover will be performed by the ONU 93 in advance.

Furthermore, according to the present invention, the OLT 91 can detect, by means of a timeout of the timers for monitoring the transfer-target port and the transfer-source port, that the ONU 93 performed a switch-back that returns it to the transfer-source wavelength, whether it performed a normal changeover or a switch-back, or that neither a normal changeover or a switch-back were completed. Consequently, in the present invention, it becomes possible to analyze and classify abnormal states such as whether a switch-back was generated due to an abnormality occurring in the ONU 93, or if the timeout occurred in the changeover-source or changeover-target timer, and it becomes easier to quickly perform a resolution.

Therefore, the present invention makes it possible to perform a maintenance action according to the degree of urgency of the abnormality that has occurred. Further, it becomes possible to respond according to the degree of urgency, and by separating the alarms arising from the case of a switch-back and from a timeout, it becomes possible to analyze the cause of failure.

EMBODIMENTS FOR CARRYING OUT THE INVENTION

Hereunder, embodiments of the present invention are described in detail with reference to the drawings. The present invention is in no way limited to the embodiments described below. The embodiments are illustrated merely as an example, and the present invention may be made by embodiments to which various modifications and improvements are performed based on the knowledge of those skilled in the art. In the present specification and in the drawings, the same reference symbols mutually denote the same elements.

(First Embodiment)

Figure 3:
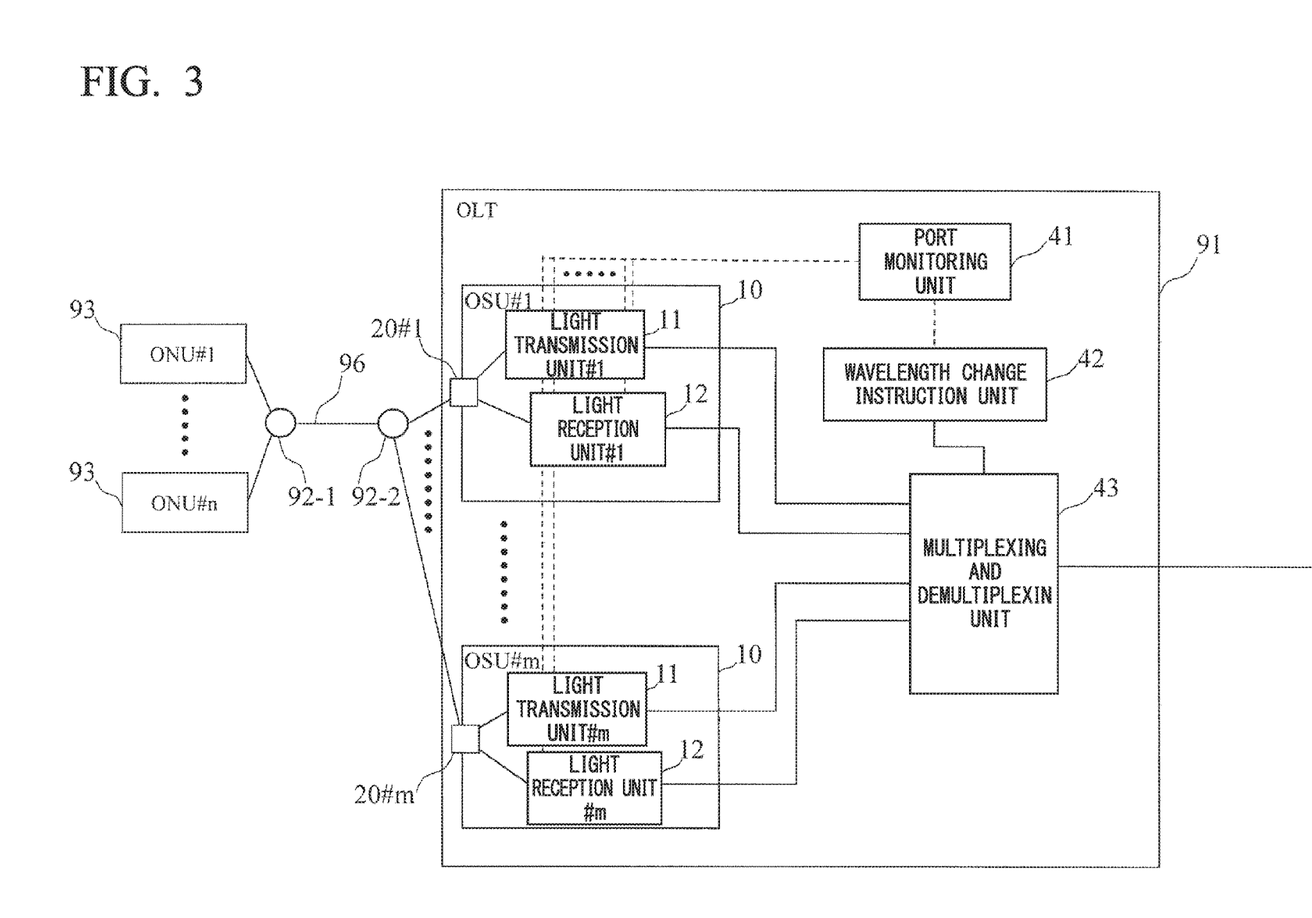
FIG. 3 shows an example of an optical communication system according to a first embodiment of the present invention.

FIG. 3 shows an example of an optical communication system according to the present embodiment.

The optical communication system according to the present embodiment includes a plurality of ONUs 93 that function as a plurality of subscriber-side devices, and an OLT 91 that functions as a station-side device.

The optical communication system according to the present embodiment is a wavelength tunable WDM/TDM-PON system, and the plurality of ONUs 93 and the OLT 91 perform transmission and reception of optical signals by wavelength division multiplexing (WDM) and time division multiplexing (TDM).

The OLT 91 includes OSUs 10 #1 to #m, ports 20 #1 to #m provided for each OSU 10, a port monitoring unit 41, a wavelength change instruction unit 42, and a multiplexing and demultiplexing unit 43. A port in the present embodiment is an example of a CT (Channel Termination) defined by the ITU-T G.989.3. Furthermore, a port in the present embodiment may be generally referred to as an OSU (Optical Subscriber Unit).

Each OSU 10 includes a light transmission unit 11 and a light reception unit 12.

The light reception unit 12 receives upstream signals transmitted from the ONUs 93. The light transmission unit 11 transmits downstream signals from the multiplexing and demultiplexing unit 43 to the ONUs 93.

The multiplexing and demultiplexing unit 43 multiplexes the upstream signals received by the OSUs 10 and transmits them to an upper network, and demultiplexes the downstream signals received from the upper network and transmits them to the OSUs 10.

The OSUs 10 #1 to #m transmit and receive optical signals with respect to the ONUs 93 using a predetermined wavelength. For example, the OSU 10 #1 transmits and receives optical signals of the wavelength $\lambda_{U\_1,D\_1}$. The OSU 10 #m transmits and receives optical signals of the wavelength $\lambda_{U\_m,D\_m}$.

The wavelength change instruction unit 42 performs processing related to the wavelength changeover sequence. For example, the wavelength change instruction unit 42 issues wavelength change instructions with respect to the ONUs 93, and processes messages related to the wavelength changeover sequence.

For example, the wavelength change instruction unit 42 instructs the ONU 93 #1 at the time T1 to change the transmission and reception wavelength from the wavelength $\lambda_{U\_1,D\_1}$ to the wavelength $\lambda_{U\_m,D\_m}$. In this case, the transfer-source wavelength is the wavelength $\lambda_{U\_1,D\_1}$, and the transfer-target wavelength is the wavelength $\lambda_{U\_m,D\_m}$. Then, the wavelength change instruction unit 42 processes messages transmitted by the ONU 93 #1 related to the wavelength changeover sequence.

The port monitoring unit 41 monitors the ports 20 #1 to #m.

For example, the port monitoring unit 41 monitors the port 20 #1 for the OSU 10 #1, which transmits and receives the transfer-source wavelength $\lambda_{U\_1,D\_1}$, and the port 20 #m for the OSU 10 #m, which transmits and receives the transfer-target wavelength $\lambda_{U\_m,D\_m}$. In this case, the port 20 #1 functions as a transfer-source port (also referred to as a transfer-source OLT port), and the port 20 #m functions as a transfer-target port (also referred to as a transfer-target OLT port). This case will be described below.

Also, the portion that monitors the port 20 #1 in the port monitoring unit 41 corresponds to the transfer-source port monitoring unit. Further, the portion that monitors the port 20 #m in the port monitoring unit 41 corresponds to the transfer-target port monitoring unit.

The monitoring described above, for example, indicates whether the port 20 #1 and the ONU 93 #1 are connected, or whether the port 20 #m and the ONU 93 #1 are connected by means of a wavelength changeover. Whether or not these connections are made can be monitored using a message related to the wavelength changeover sequence in the wavelength change instruction unit 42.

The port monitoring unit 41 includes a transfer-source timer and a transfer-target timer.

The transfer-source timer counts a transfer-source elapsed time at the transfer-source port 20 #1 from the time T1, at which the wavelength change instruction unit 42 issues the wavelength change instruction. Also, the transfer-target timer counts a transfer-target elapsed time at the transfer-target port 20 #m from the time T1, at which the wavelength change instruction unit 42 issues the wavelength change instruction.

When the transfer-source timer and the transfer-target timer respectively reach a certain count amount, it is determined that a timeout has occurred. However, this is merely an example, and the timers used in the present embodiment may be any function that continues for a set time lapse, and notifies that a certain set time has elapsed. Therefore, for example, it may be a timer which subtracts a set amount of time from T1, and determines that a timeout has occurred when the timer value becomes zero.

When the port monitoring unit 41 detects a successful connection between the transfer-source port 20 #1 and the ONU 93 #1 before a predetermined elapsed time, the port monitoring unit 41 ends the counting of the elapsed time by the transfer-target timer. Then, the port monitoring unit 41 ends the counting of the elapsed time at the transfer-source timer and the transfer-target timer, and sets the transfer-source port 20 #1 and transfer-target port 20 #m to a normal operation. That is to say, the OSUs 10 #1 and 10 #m are set to a normal operation.

The port monitoring unit 41 may monitor whether the wavelength changeover was completed normally. In this case, the sequence is as follows.

The port monitoring unit 41 sets the start time of the wavelength changeover as the time at which the wavelength change instruction unit 42 issues the wavelength change instruction, and starts both timers, namely the transfer-source timer and the transfer-target timer, at the start time of the wavelength changeover.

The time T1 at which the timers are started is in no way limited to the time at which the wavelength change instruction is issued with respect to the ONU 93 #1. It can be made an arbitrary time triggered by the wavelength change instruction. For example, it may be immediately before the time at which the wavelength change instruction is issued to the ONU 93 #1.

If a normal wavelength changeover of the ONU 93 #1 is completed, the transfer-target port 20 #m receives an upstream changeover completion signal. In this case, the port monitoring unit 41 detects a successful connection between the ONU 93 #1 and the transfer-target port 20 #m. Then, the port monitoring unit 41 ends the transfer-target timer, and also ends the transfer-source timer. Further, the counting of the elapsed time at the transfer-source timer and the transfer-target timer is ended.

If a switch-back to the transfer-source port 20 #1 is completed (without being able to change to the transfer-target OSU 10 #m), the transfer-source port 20 #1 receives a switch-back completion signal. In this case, the port monitoring unit 41 detects a successful connection between the ONU 93 #1 and the transfer-target port 20 #1. Then, the port monitoring unit 41 ends the transfer-source timer, and similarly ends the transfer-target timer. Further, it ends the counting of the elapsed time at the transfer-source timer and the transfer-target timer.

If at least one of the transfer-target timer and the transfer-source timer has expired and timed out, the port monitoring unit 41 determines that the wavelength has been changed to one that is different from both of the transfer-source wavelength and the transfer-source wavelength without the wavelength changeover being performed normally due to a failure or malfunction of the wavelength changeover control circuit within the ONU, and starts exception operation processing such as issuing of an alarm.

For example, if the transfer-source timer ends and the transfer-target timer has expired and timed out, the port monitoring unit 41 determines that the switch-back has been completed, but there is a possibility that some kind of abnormality has occurred in the transfer-target port 20 #m.

Furthermore, if the transfer-target timer ends the counting and the transfer-source timer has expired and timed out, the port monitoring unit 41 determines that a normal wavelength changeover has been completed, but there is a possibility that some kind of abnormality has occurred in the transfer-source port 20 #1.

Also, if there is additionally no connection of either the transfer-target port 20 #m or the transfer-source port 20 #1 with the ONU 93 #1 when the predetermined elapsed time has elapsed, the port monitoring unit 41 determines that there is a possibility that some kind of abnormality has occurred in the ONU 93 #1.

The port monitoring unit 41 may have an alarm unit (not shown in the figure) that issues an alarm if it is determined that there is a possibility that some kind of abnormality has occurred. In this case, the alarm may be illumination of a display, and includes all alarm operations such as an alarm sound and an e-mail notification to an administrator.

A wavelength changeover monitoring method according to the present embodiment is performed in a sequence including a wavelength change instruction step, a port monitoring step, and a timer ending step.

In the wavelength change instruction step, the wavelength change instruction unit 42 issues, to the ONU 93 #1, a wavelength change instruction to change the transfer-source wavelength $\lambda_{U\_1,D\_1}$ assigned to the ONU 93 #1 to the transfer-target wavelength $\lambda_{U\_m,D\_m}$.

In the port monitoring step, the port monitoring unit 41 detects a connection between the transfer-source port 20 #1 and the ONU 93 #1, and detects a connection between the transfer-target port 20 #m and the ONU 93 #1.

In the timer ending step, the port monitoring unit 41 ends the counting of the elapsed time at the transfer-source timer when the port monitoring unit 41 detects a successful connection between the transfer-source port 20 #1 and the ONU 93 #1 within a previously determined predetermined time from the time T1. Also, the port monitoring unit 41 ends the counting of the elapsed time at the transfer-target timer when the port monitoring unit 41 detects a successful connection between the transfer-source port 20 #m and the ONU 93 #1 within a previously determined predetermined time from the time T1.

Figure 4:
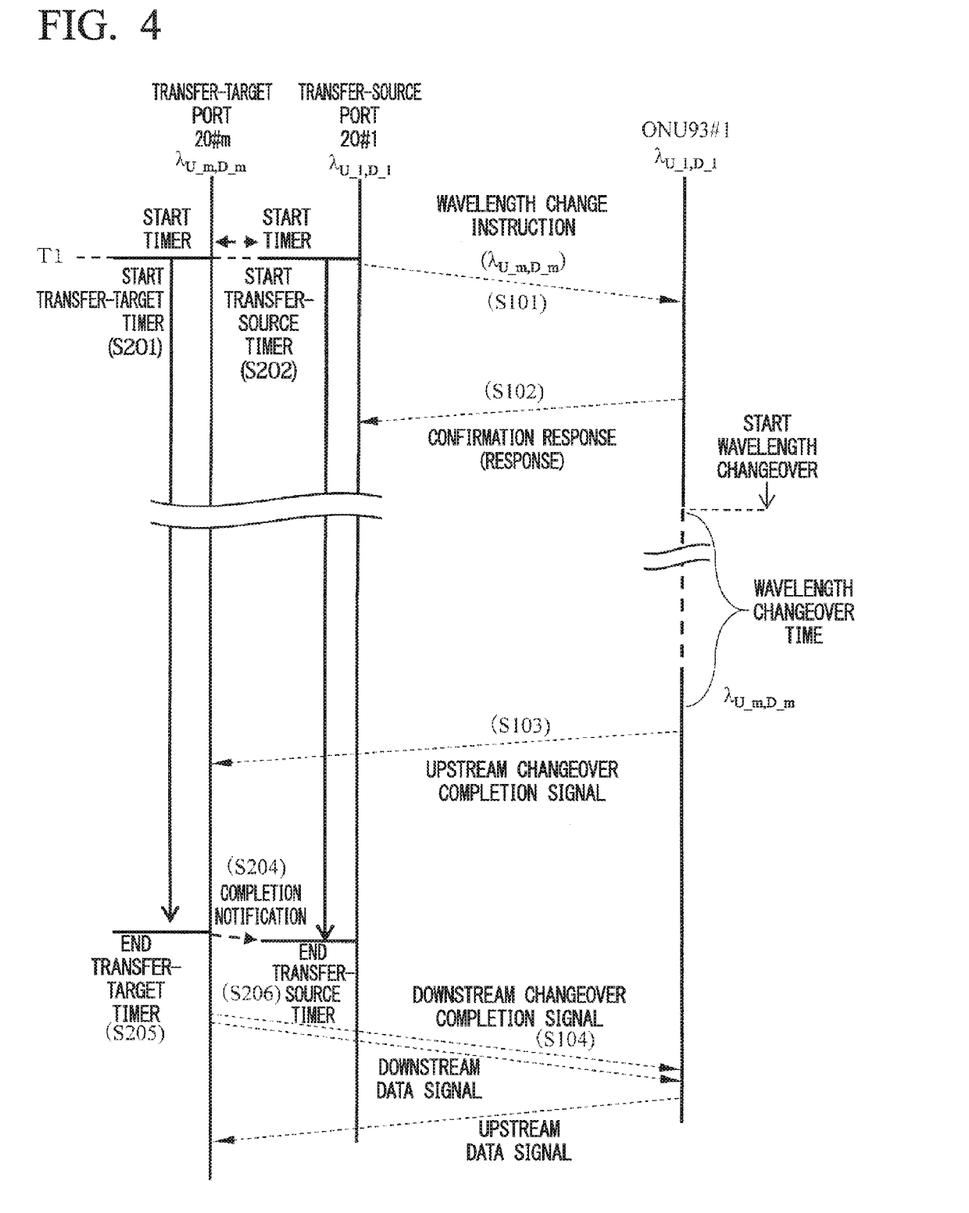
FIG. 4 shows an example of a normal changeover sequence in a wavelength changeover sequence according to the first embodiment of the present invention.

FIG. 4 shows a sequence diagram for the case of a changeover from the transfer-source wavelength $\lambda_{U\_1,D\_1}$ to the transfer-target wavelength $\lambda_{U\_m,D\_m}$. S101 is performed in the wavelength change instruction step described above. S201 and S202 are performed in the port monitoring step described above. S204 to S206 are performed in the timer ending step described above.

In the case of a transfer from the transfer-source port 20 #1 to the transfer-target port 20 #m, the OSU 10 #1 transmits a wavelength change instruction ($\lambda_{U\_m,D\_m}$) from the transfer-source port 20 #1 to the ONU 93 #1 (S101).

The port monitoring unit 41 starts the counting of the transfer-target timer and the transfer-source timer (S201 and S202).

Then, the ONU 93 #1 returns a confirmation response (response), and starts the wavelength changeover (S102). At this time, the transfer-source port 20 #1 receives the confirmation response (response), and the wavelength change instruction unit 42 processes the confirmation response (response) received by the transfer-source port 20 #1.

When the wavelength changeover is completed, the ONU 93 #1 transmits an upstream changeover completion signal to the transfer-target port 20 #m (S103). At this time, the transfer-target port 20 #m receives the upstream changeover completion signal, and the wavelength change instruction unit 42 processes the upstream changeover completion signal received by the transfer-target port 20 #m.

When the port monitoring unit 41 detects that the transfer-target port 20 #m has received the upstream changeover completion signal, it ends the counting of the transfer-target timer (S205). Then, the port monitoring unit 41 issues a completion notification to the transfer-source timer (S204), and ends the transfer-source timer (S206).

Next, the port monitoring unit 41 transmits a downstream changeover completion signal to the ONU 93 #1 from the transfer-target port 20 #m (S104). Then, both ports 20 #1 and 20 #m are in a normal operation, and the transfer-target port 20 #m and the ONU 93 #1 start communication using the new wavelength $\lambda_{U\_m,D\_m}$.

Figure 5:
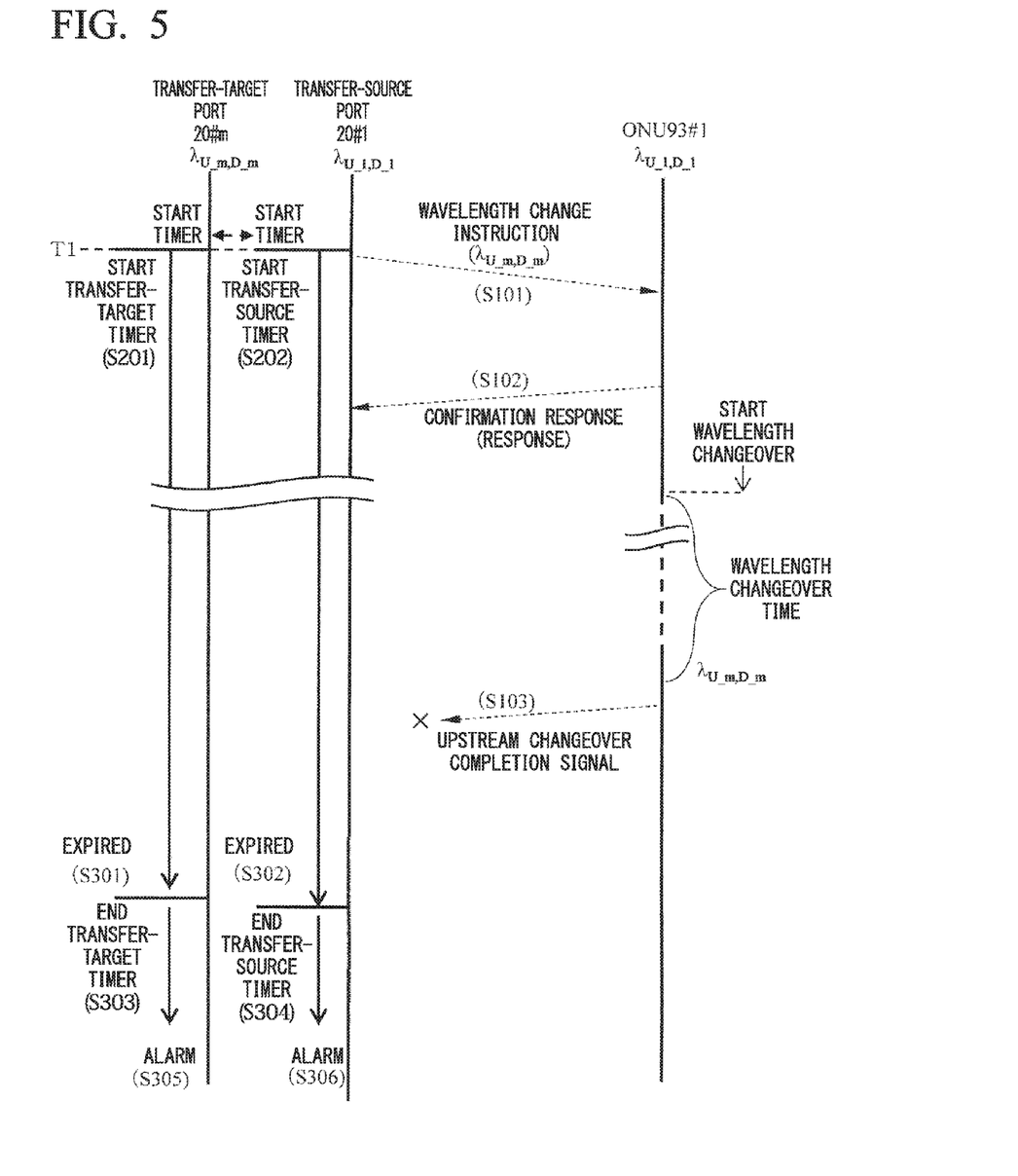
FIG. 5 shows an example of a case where a changeover is not made within a predetermined time in the wavelength changeover sequence according to the first embodiment of the present invention.

FIG. 5 shows a sequence diagram for the case where a wavelength changeover is not performed within a predetermined time. In this case, S101 is performed in the wavelength change instruction step described above. S201 and S202 are performed in the port monitoring step described above. S301 to S304 are performed in the timer ending step described above.

In the case of a transfer from the transfer-source port 20 #1 to the transfer-target port 20 #m, the wavelength change instruction unit 42 transmits a wavelength change instruction ($\lambda_{U\_m,D\_m}$) from the transfer-source port 20 #1 to the ONU 93 #1 (S101).

When the wavelength change instruction unit 42 issues the wavelength change instruction, the port monitoring unit 41 starts the counting of the transfer-target timer and the transfer-source timer (S201 and S202).

Then, the ONU 93 #1 returns a confirmation response (response) (S102), and starts the wavelength changeover.

If the wavelength changeover is not successful (S103), the transfer-target timer and the transfer-source timer end as expired (S301 and S302). In this case, the port monitoring unit 41 ends the transfer-target timer and the transfer-source timer (S303 and S304), and performs an alarm operation (S305 and S306). Consequently, it is possible to respond quickly to device abnormalities.

Figure 6:
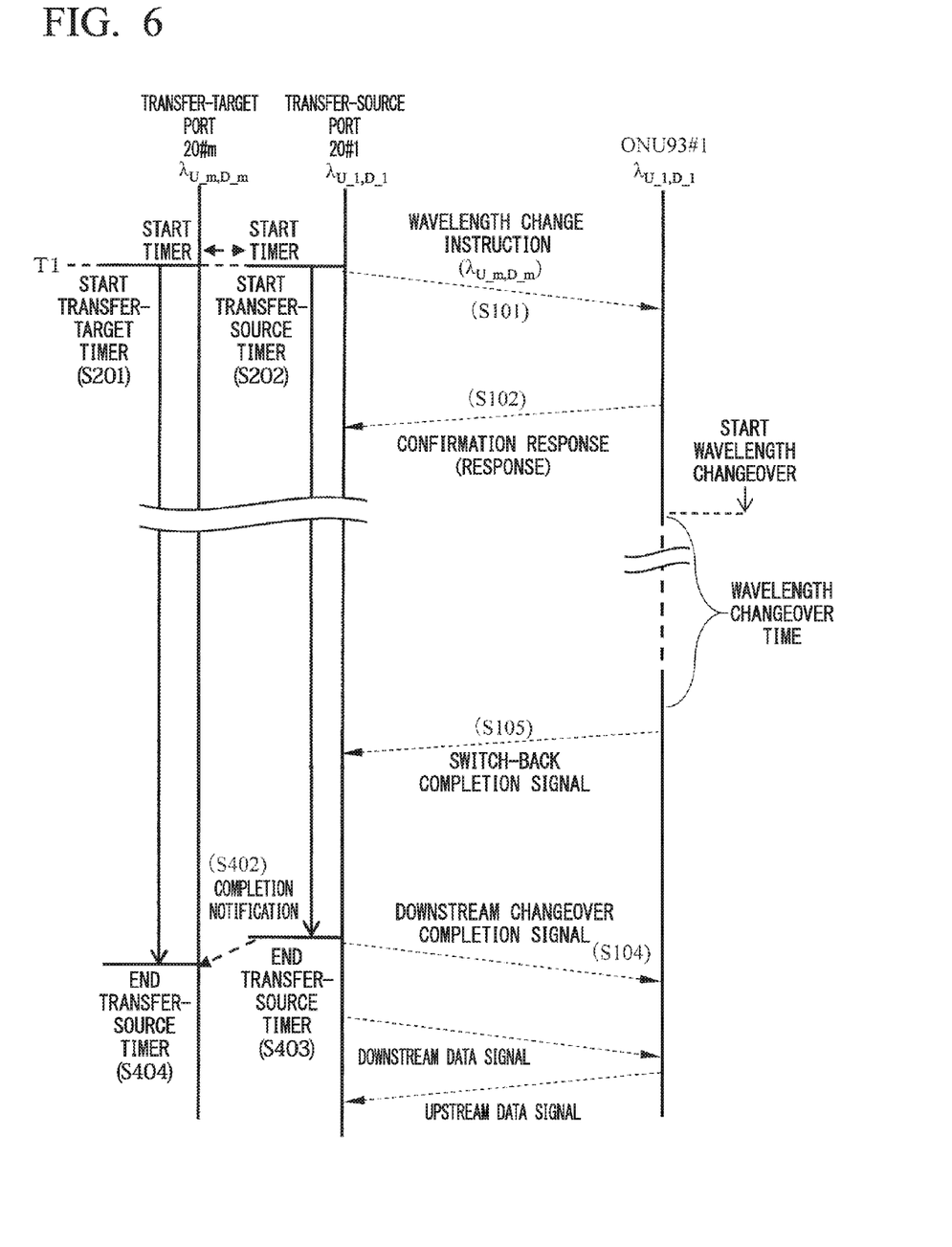
FIG. 6 shows an example of a transition at the time of a switch-back in the wavelength changeover sequence according to the first embodiment of the present invention.

FIG. 6 shows a sequence diagram at the time of a switch-back (that returns to the transfer-source wavelength). S101 is performed in the wavelength change instruction step described above. S201 and S202 are performed in the port monitoring step described above. S402 to S404 are performed in the timer ending step described above.

In the case of a transfer from the transfer-source port 20 #1 to the transfer-target port 20 #m, the wavelength change instruction unit 42 transmits a wavelength change instruction ($\lambda_{U\_m,D\_m}$) from the transfer-source port 20 #1 to the ONU 93 #1 (S101). The port monitoring unit 41 starts the counting of the transfer-target timer and the transfer-source timer (S201 and S202).

Then, the ONU 93 #1 returns a confirmation response (response) (S102), and starts the wavelength changeover.

When the wavelength changeover is not successful but operation is possible using the original signal, the ONU 93 #1 transmits a switch-back completion signal to the transfer-source port 20 #1 (S105). At this time, the transfer-source port 20 #1 receives the switch-back completion signal, and the wavelength change instruction unit 42 processes the switch-back completion signal received by the transfer-source port 20 #1.

The port monitoring unit 41 detects that the transfer-source port 20 #1 has received the switch-back completion signal. Then, the port monitoring unit 41 ends the counting of the transfer-source timer (S403). Next, the transfer-source port 20 #1 returns a downstream changeover completion signal with respect to the ONU 93 #1 (S104). The port monitoring unit 41 issues a completion notification to the transfer-target timer (S402), and ends the counting of the transfer-target timer (S404).

Then, both ports 20 #1 and #m are in a normal operation, and the transfer-source port 20 #1 and the ONU 93 #1 start communication using the original wavelength. In the case a switch-back has been performed, since it is in a normal state in terms of operation, the port monitoring unit 41 does not issue an alarm. Consequently, an alarm operation can be performed only when the alarm or the like is truly urgent.

(Second Embodiment)

Figure 7:
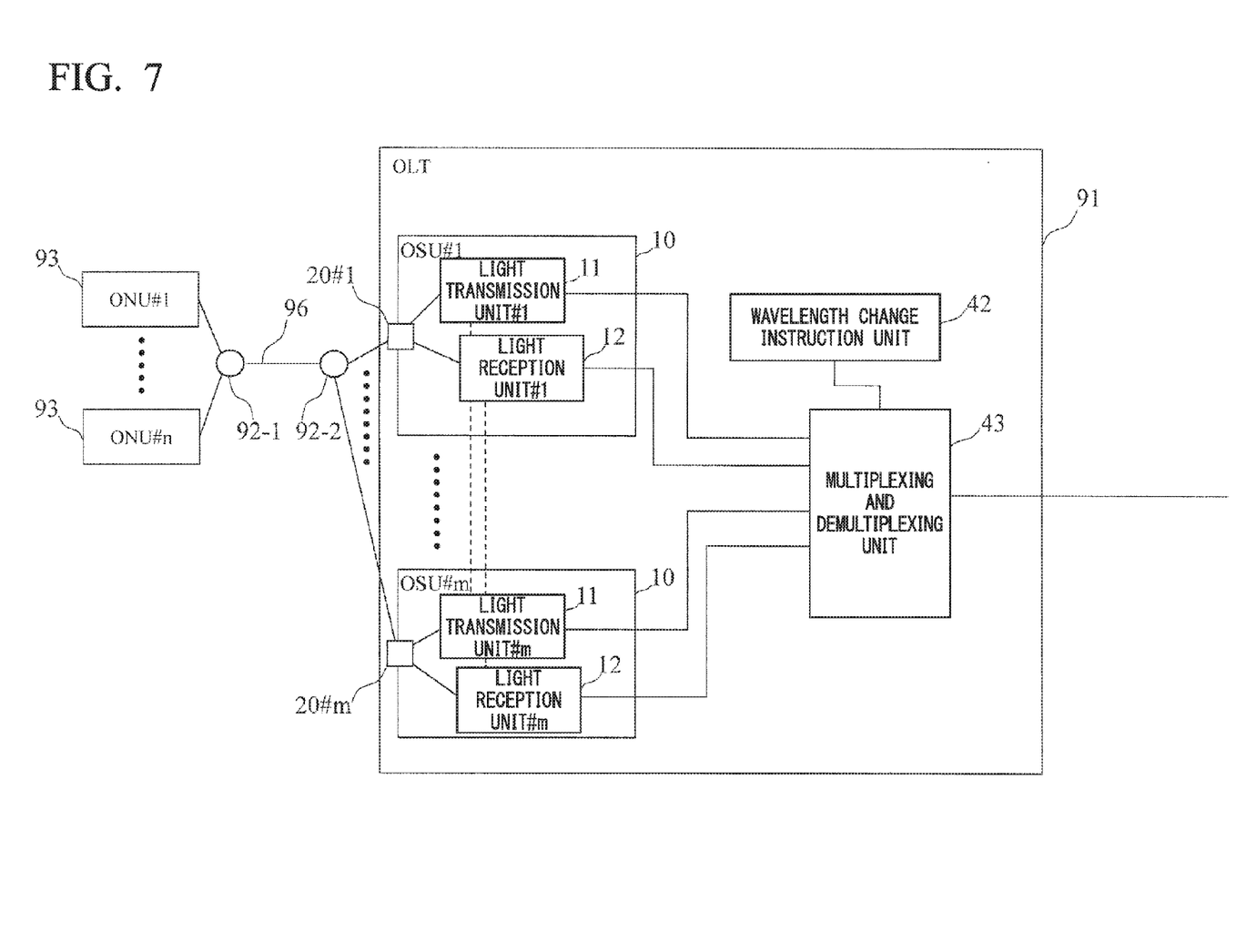
FIG. 7 shows an example of an optical communication system according to a second embodiment of the present invention.

FIG. 7 shows an example of an optical communication system according to the present embodiment.

In the optical communication system according to the present embodiment, each port 20 includes a port monitoring unit that functions as a transfer-source port monitoring unit and a transfer-target port monitoring unit. The port monitoring unit of each port 20 includes a timer that functions as a transfer-source timer and a transfer-target timer.

In the present embodiment, a description will be given of a case where the wavelength change instruction unit 42 instructs the ONU 93 #1 at the time T1 to change the transmission and reception wavelength from the wavelength $\lambda_{U\_1,D\_1}$ to the wavelength $\lambda_{U\_m,D\_m}$.

In this case, the wavelength changeover sequence is as follows.

The port monitoring unit of each port 20 sets the start time of the wavelength changeover as the time at which the wavelength change instruction unit 42 issues the wavelength change instruction, and starts the transfer-source timer and the transfer-target timer at the start time of the wavelength changeover. Here, the time T1 at which the timers are started is in no way limited to the time at which the wavelength change instruction is issued to the ONU 93 #1. It can be an arbitrary time triggered by the wavelength change instruction. For example, it may be immediately before the time at which the wavelength change instruction is issued to the ONU 93 #1.

If a normal wavelength changeover of the ONU 93 is completed and the transfer-target port 20 #m receives an upstream changeover completion signal, the wavelength change instruction unit 42 acquires the upstream changeover completion signal from the transfer-target port 20 #m. Further, the transfer-target port monitoring unit provided in the transfer-target port 20 #m detects a successful connection between the transfer-target port 20 #m and the ONU 93 #1. Then, the transfer-target timer of the transfer-target port 20 #m ends the counting.

The transfer-target port monitoring unit of the transfer-target port 20 #m notifies completion of the wavelength changeover to the transfer-source port 20 #1, and the transfer-source port monitoring unit of the transfer-source port 20 #1 ends the transfer-source timer.

If a switch-back to the transfer-source port 20 #1 is completed (without being able to change to the transfer-target OSU 10 #m) and the wavelength change instruction unit 42 receives a switch-back completion signal, the wavelength change instruction unit 42 acquires the switch-back completion signal from the transfer-source port 20 #1. Further, the transfer-source port monitoring unit of the transfer-source port 20 #1 detects a successful connection between the transfer-source port 20 #1 and the ONU 93 #1. Then, the transfer-source timer of the transfer-source port 20 #1 ends the counting.

The transfer-source port monitoring unit of the transfer-source port 20 #1 notifies completion of the switch-back to the transfer-target port 20 #m, and the transfer-target port monitoring unit of the transfer-target port 20 #m ends the transfer-target timer.

If at least one of the transfer-source timer and the transfer-target timer has expired and timed out, the transfer-source port monitoring unit or the transfer-target port monitoring unit determines that the wavelength has been changed to one that is different from both of the transfer-source wavelength and the transfer-source wavelength without the wavelength changeover being performed normally, and starts exception operation processing such as issuing of an alarm.

Furthermore, if the transfer-target timer ends but the transfer-source timer has expired, the transfer-source port monitoring unit determines that the switch-back has been completed, but there is a possibility that some kind of abnormality has occurred in the transfer-source port 20 #1.

Also, if the transfer-source timer ends but the transfer-target timer has expired and timed out, the transfer-target port monitoring unit determines that a normal wavelength changeover has been completed, but there is a possibility that some kind of abnormality has occurred in the transfer-target port 20 #m.

Therefore, it is possible to analyze the cause of failure from the state of the transfer-source timer and the transfer-target timer.

The ports 20 #1 to #m may have an alarm unit (not shown in the figure) that receives an instruction from the transfer-source port monitoring unit or the transfer-target port monitoring unit and issues an alarm when there is no connection of either the transfer-target port 20 #m or the transfer-source port 20 #1 with the ONU 93 #1 when the predetermined elapsed time has elapsed.

In this case, the alarm may be illumination of a display, and includes all alarm operations such as an alarm sound and an e-mail notification to an administrator.

Hereunder, again using FIG. 4 described above, a sequence diagram is shown for the case of a changeover from the wavelength $\lambda_{U\_1,D\_1}$ to the wavelength $\lambda_{U\_m,D\_m}$ in the second embodiment.

In the case of a transfer from the transfer-source port 20 #1 to the transfer-target port 20 #m, the transfer-source port 20 #1 transmits a wavelength change instruction ($\lambda_{U\_m,D\_m}$) to the ONU 93 #1 (S101). The transfer-source timer of the transfer-source port 20 #1 starts the counting, and the transfer-target timer of the transfer-target port 20 #m starts the counting.

Then, the ONU 93 #1 returns a confirmation response (response) (S102), and starts the wavelength changeover. At this time, the transfer-source port 20 #1 receives the confirmation response (response), and the wavelength change instruction unit 42 processes the confirmation response (response) received by the transfer-source port 20 #1.

When the wavelength changeover is completed, ONU 93 #1 transmits an upstream changeover completion signal to the transfer-target port 20 #m (S103). At this time, the transfer-target port 20 #m receives the upstream changeover completion signal, and the wavelength change instruction unit 42 processes the upstream changeover completion signal received by the transfer-target port 20 #m.

When the transfer-target port 20 #m receives the upstream changeover completion signal, the transfer-target port monitoring unit described above detects a successful connection between the transfer-target port 20 #m and the ONU 93 #1, and the transfer-target timer ends the counting. The transfer-target port monitoring unit of the transfer-target port 20 #m issues a completion notification to the transfer-source port 20 #1. The transfer-source port monitoring unit of the transfer-source port 20 #1, which has received the completion notification, ends the transfer-source timer.

The transfer-target port 20 #m transmits a downstream changeover completion signal to the ONU 93 #1 (S104). Then, both ports 20 #1 and 20 #m are in a normal operation, and the transfer-target port 20 #m and the ONU 93 #1 start communication using the new wavelength $\lambda_{U\_m,D\_m}$.

Hereunder, again using FIG. 5 described above, a sequence diagram is shown for the case a wavelength changeover is not performed within a predetermined time in the second embodiment.

In the case of a transfer from the transfer-source port 20 #1 to the transfer-source port 20 #m, the transfer-source port 20 #1 transmits a wavelength change instruction ($\lambda_{U\_m,D\_m}$) to the ONU 93 #1 (S101). The transfer-source timer of the transfer-source port 20 #1 starts the counting, and the transfer-target timer of the transfer-target port 20 #m starts the counting.

Then, the ONU 93 #1 returns a confirmation response (response) (S102), and starts the wavelength changeover.

If the wavelength changeover is not successful (S103), the transfer-source timer and the transfer-target timer timeout and end as expired. If the transfer-source timer and the transfer-target timer timeout and end as expired, the transfer-source port monitoring unit and the transfer-target port monitoring unit perform an alarm operation. Consequently, it is possible to respond quickly to device abnormalities.

Hereunder, again using FIG. 6 described above, a sequence diagram is shown at the time of a switch-back in the second embodiment.

In the case of a transfer from the transfer-source port 20 #1 to the transfer-target port 20 #m, the transfer-source port 20 #1 transmits a wavelength change instruction ($\lambda_{U\_m,D\_m}$) to the ONU 93 #1 (S101). The transfer-source timer of the transfer-source port 20 #1 starts the counting, and the transfer-target timer of the transfer-target port 20 #m starts the counting.

Then, the ONU 93 #1 returns a confirmation response (response) (S102), and starts the wavelength changeover.

When the wavelength changeover is not successful but operation is possible using the original signal, the ONU 93 #1 transmits a switch-back completion signal to the transfer-source port 20 #1 (S105). At this time, the transfer-source port 20 #1 receives the switch-back completion signal, and the wavelength change instruction unit 42 processes the switch-back completion signal received by the transfer-source port 20 #1.

When the transfer-source port 20 #1 receives the switch-back completion signal, the transfer-source timer of the transfer-source port 20 #1 ends the counting. The transfer-source port monitoring unit of the transfer-source port 20 #1 also issues a completion notification to the transfer-target port 20 #m. The transfer-target port monitoring unit of the transfer-target port 20 #m ends the transfer-target timer.

Then, both ports 20 #1 and #m are in a normal operation, and the transfer-source port 20 #1 and the ONU 93 #1 start communication using the original wavelength. In the case a switch-back has been performed, since it is in a normal state in terms of operation, it is in a normal state in terms of operation, the transfer-source port monitoring unit and the transfer-target port monitoring unit do not issue an alarm. Consequently, an alarm operation can be performed only when the alarm or the like is truly urgent.

(Third Embodiment)

Figure 8:
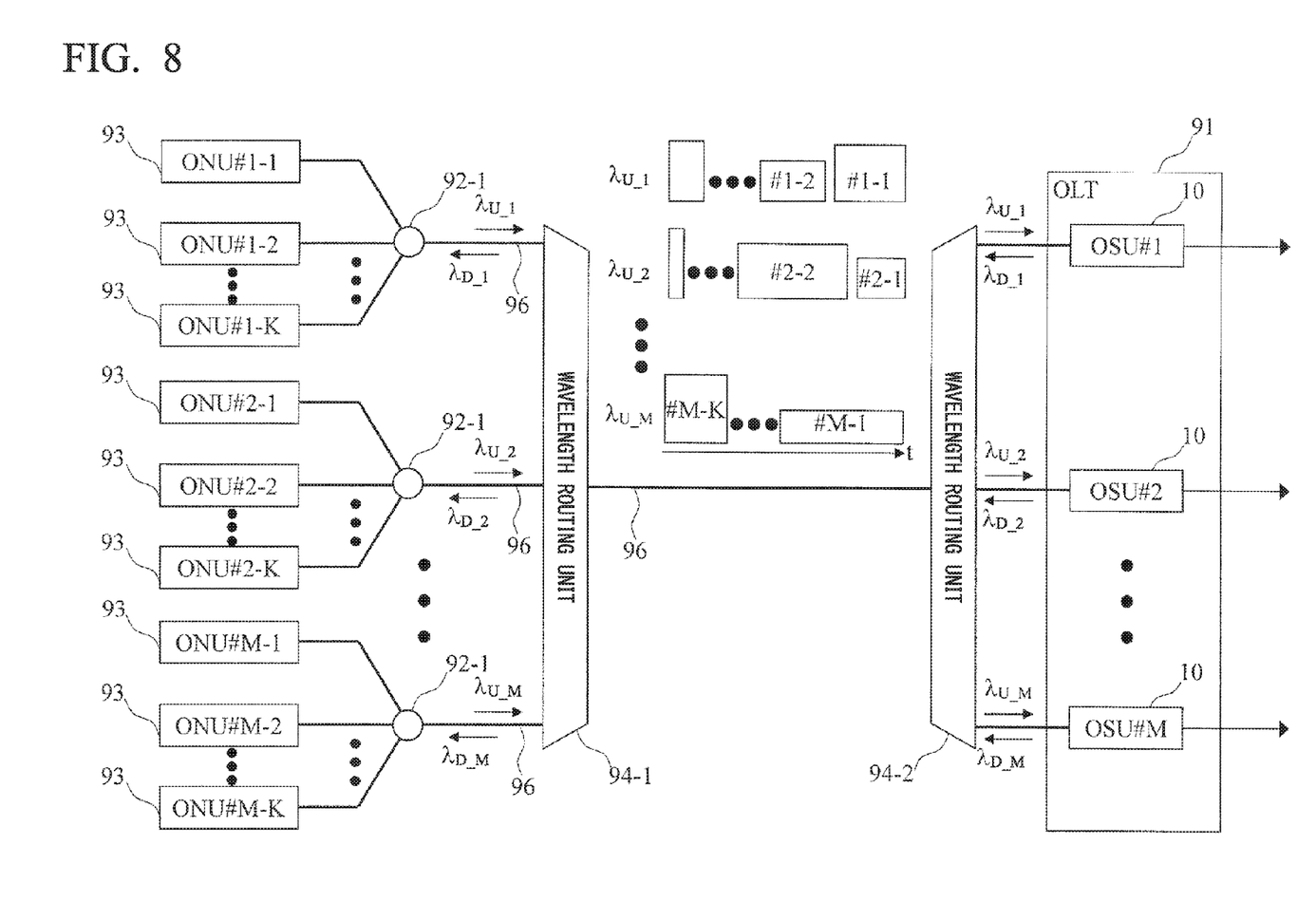
FIG. 8 shows an example of an optical communication system according to a third embodiment of the present invention.

FIG. 8 shows an example of an optical communication system according to the present embodiment.

The optical communication system according to the present embodiment includes a plurality of OLTs 91 according to the first embodiment described above. In the present embodiment, a description will be given of a case where an ONU 93 accommodated by one OLT 91 is changed to be accommodated by another OLT 91.

In the present embodiment, in a PON system including a plurality of wavelength tunable WDM/TDM-PON station-side devices 91 (OLT) that transmit and receive optical signals with respect to an ONU 93 by wavelength division multiplexing (WDM) and time division multiplexing (TDM), between two arbitrary OLTs 91 among two or more OLTs 91, the ONU 93 #1 accommodated by the transfer-source port 20 #1 of the transfer-source OLT 91 #1 is changed to be accommodated by the transfer-target port 20 #n of the transfer-target OLT 91 #2. In this case, the sequence is as follows.

The wavelength change instruction unit 42 provided in the transfer-source OLT 91 #1 issues a wavelength change instruction to switch the upstream wavelength used for communication by the ONU 93 #1 accommodated in the transfer-source OLT 91 #1 from the current wavelength to the wavelength of the newly assigned transfer-target OLT 91 #2.

The port monitoring unit 41 provided in the transfer-source OLT 91, in response to the wavelength change instruction, starts the counting of the transfer-source timer from the time the wavelength change instruction unit 42 provided in the transfer-source OLT 91 #1 issues the wavelength change instruction to the ONU 93 #1. Then, the transfer-source OLT 91 #1 notifies the transfer-target OLT 91 #2 via a line concentrator 95 that it has issued the wavelength change instruction.

Upon receiving the notification, the transfer-target OLT 91 #2 starts the counting of the transfer-target timer of the port monitoring unit 41. The sequence of the accommodation change from the transfer-source port 20 #1 to the transfer-target port 20 #n thereafter is the same as that of the first embodiment.

The accommodation change of the ONU 93 according to the present embodiment can also be applied to an accommodation change between geographically different OLTs 91 #1 and 91 #2. However, when starting and ending the transfer-source timer and the transfer-target timer between the OLT 91 #1 and 91 #2, it is necessary to add a path with which the port monitoring units 41 provided in each of the OLTs 91 #1 and #2 corporate.

For example, a path for exchanging signals between the port monitoring units 41 of the OLTs 91 may be provided. The path may be a separate line from the main signal, or exchange may be performed by mixing with the main signal via the line concentrator 95.

The optical communication system according to the third embodiment may also be applied to a configuration without the port monitoring unit 41 according to the second embodiment.

INDUSTRIAL APPLICABILITY

The present invention may be applied to the information communication industry.

REFERENCE SYMBOLS

10 OSU
11 Light transmission unit
12 Light reception unit
13 Wavelength multiplexing and demultiplexing unit
20 Port
31 Wavelength tunable light transmission unit
32 Wavelength tunable light reception unit
33 Wavelength multiplexing and demultiplexing unit
41 Port monitoring unit
42 Wavelength change instruction unit
43 Multiplexing and demultiplexing unit
91 OLT
92-1, 92-2 Optical multiplexing and demultiplexing unit
93 ONU
94-1, 94-2 Wavelength routing unit
95 Line concentrator
96 Optical fiber transmission line
121 Light receiving unit
122 Wavelength filter
321 Light receiving unit
322 Wavelength tunable filter

The invention claimed is:

1. A station-side device comprising:
   a wavelength change instruction unit that issues, to a subscriber-side device, a wavelength change instruction to change a transfer-source wavelength assigned to the subscriber-side device to a transfer-target wavelength different from the transfer-source wavelength;
   a transfer-source port that transmits and receives an optical signal of the transfer-source wavelength;
   a transfer-target port that transmits and receives an optical signal of the transfer-target wavelength;
   a transfer-source port monitoring unit that detects a connection between the transfer-source port and the subscriber-side device;
   a transfer-target port monitoring unit that detects a connection between the transfer-target port and the subscriber-side device;
   a transfer-source timer that counts, at the transfer-source port, an elapsed time from a predetermined starting time with respect to the wavelength change instruction, and ends the counting of the elapsed time in a case where change to the transfer-target wavelength is complete; and
   a transfer-target timer that counts, at the transfer-target port, an elapsed time from a predetermined time with respect to the wavelength change instruction, and ends the counting of the elapsed time in a case where the change to the transfer-target wavelength is complete.

2. The station-side device according to claim 1,
   wherein in a case where the transfer-source port monitoring unit detects a successful connection with the subscriber-side device within a predetermined time from when the transfer-source timer starts counting of the elapsed time, the transfer-source timer ends the counting of the elapsed time and the station-side device ends the counting of the elapsed time at the transfer-target timer, and
   in a case where the transfer-target port monitoring unit detects a successful connection with the subscriber-side device within a predetermined time from when the transfer-target timer starts the counting of the elapsed time, the transfer-target timer ends the counting of the elapsed time and the station-side device ends the counting of the elapsed time at the transfer-source timer.

3. The station-side device according to claim 1,
   wherein in a case where the counting of the elapsed time at the transfer-source timer has not ended and the transfer-source timer is in an expired state when a predetermined time has elapsed from when the transfer-source timer starting the counting of the elapsed time, the station-side device issues a notification that an abnormality has occurred at the transfer-source port, and
   in a case where the counting of the elapsed time at the transfer-target timer has not ended and the transfer-target timer is in an expired state when a predetermined time has elapsed from when the transfer-target timer starts the counting of the elapsed time, the station-side device issues a notification that an abnormality has occurred at the transfer-target port.

4. A wavelength changeover monitoring method performed by a station-side device, the method comprising:
   issuing, to a subscriber-side device, a wavelength change instruction to change a transfer-source wavelength assigned to the subscriber-side device to a transfer-target wavelength different from the transfer-source wavelength;
   detecting a connection between a transfer-source port and the subscriber-side device, the transfer-source port transmitting and receiving an optical signal of the transfer-source wavelength;
   detecting a connection between a transfer-target port and the subscriber-side device, the transfer-target port transmitting and receiving an optical signal of the transfer-target wavelength;
   counting, at the transfer-source port, an elapsed time from a predetermined starting time with respect to the wavelength change instruction;
   ending the counting of the elapsed time at the transfer-source port in a case where change to the transfer-target wavelength is complete;
   counting, at the transfer-target port, an elapsed time from a predetermined time with respect to the wavelength change instruction; and
   ending the counting of the elapsed time at the transfer-target port in a case where the change to the transfer-target wavelength is complete.

* * * * *